US008249656B2

(12) United States Patent
Sherman et al.

(10) Patent No.: US 8,249,656 B2
(45) Date of Patent: Aug. 21, 2012

(54) WIRELESS COMMUNICATOR JACKET WITH MULTIPLE OPERATIONAL STAGES

(75) Inventors: Itay Sherman, Hod Hasharon (IL); Yohan Yehouda Cohen, Shaked (IL)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 12/704,039

(22) Filed: Feb. 11, 2010

(65) Prior Publication Data
US 2010/0210308 A1    Aug. 19, 2010

Related U.S. Application Data

(60) Provisional application No. 61/152,708, filed on Feb. 15, 2009.

(51) Int. Cl.
*H04B 3/18* (2006.01)
(52) U.S. Cl. ........... 455/558; 455/557; 710/25; 710/301
(58) Field of Classification Search ............... 455/550.1, 455/552.1, 553.1, 556.1, 556.2, 557–559, 455/575.6, 575.8, 344–350, 407, 418–420; 710/13, 3, 4, 21, 52, 62, 67, 71, 72, 100, 710/300–313, 104–108, 25, 84; 711/100–105, 711/114–116, 141–145; 341/22–34, 52
See application file for complete search history.

(56) References Cited

U.S. PATENT DOCUMENTS

| | | | |
|---|---|---|---|
| 5,625,673 A | 4/1997 | Grewe et al. | |
| 5,628,055 A | 5/1997 | Stein | |
| 5,809,115 A | 9/1998 | Inkinen | |
| 5,893,037 A | 4/1999 | Reele et al. | |
| 5,907,815 A | 5/1999 | Grimm et al. | |
| 5,940,076 A * | 8/1999 | Sommers et al. | 715/834 |
| 6,188,917 B1 | 2/2001 | Laureanti | |
| 6,201,867 B1 | 3/2001 | Koike | |
| 6,243,578 B1 | 6/2001 | Koike | |
| 6,385,463 B1 * | 5/2002 | Lieberman et al. | 455/557 |

(Continued)

FOREIGN PATENT DOCUMENTS

EP    1871075 A1    12/2007

(Continued)

OTHER PUBLICATIONS

Intel, "80C51SL-BG, Keyboard Controller", Oct. 1991.*

*Primary Examiner* — Jinsong Hu
*Assistant Examiner* — San Htun
(74) *Attorney, Agent, or Firm* — Soquel Group LLC (57) ABSTRACT

A method of communication between a modular wireless communicator and a jacket device that is connected to the modular wireless communicator via a connector a connector that connects a plurality of signal transmission lines, the jacket device including a keypad for operating the modular wireless communicator, including receiving a multi-bit signal over multiple signal transmission lines, one bit of which indicating whether the jacket device includes a serial NOR flash memory, if the jacket device includes a serial NOR flash memory, then reading a jacket ID from the serial NOR flash memory, if the jacket device does not include a serial NOR flash memory, then reading the jacket ID from other bits of the multi-bit signal, receiving jacket keypad signals over multiple signal transmission lines, and decoding the jacket keypad signals based on the jacket ID.

10 Claims, 8 Drawing Sheets

U.S. PATENT DOCUMENTS

| | | |
|---|---|---|
| 6,477,357 B1 | 11/2002 | Cook |
| 6,516,202 B1 | 2/2003 | Hawkins et al. |
| 6,640,113 B1 | 10/2003 | Shim et al. |
| 6,690,947 B1 | 2/2004 | Tom |
| 6,898,283 B2 | 5/2005 | Wycherley et al. |
| 6,907,264 B1 | 6/2005 | Sterkel |
| 6,999,792 B2 | 2/2006 | Warren |
| 7,085,542 B2 | 8/2006 | Dietrich et al. |
| 7,130,958 B2 * | 10/2006 | Chou et al. .................... 711/103 |
| 7,194,285 B2 | 3/2007 | Tom |
| 7,266,391 B2 | 9/2007 | Warren |
| 7,477,919 B2 | 1/2009 | Warren |
| 7,515,937 B2 | 4/2009 | Lee |
| 2001/0021956 A1 * | 9/2001 | Okamoto et al. ............. 710/102 |
| 2002/0090980 A1 | 7/2002 | Wilcox et al. |
| 2002/0151327 A1 | 10/2002 | Levitt |
| 2004/0137935 A1 * | 7/2004 | Zarom ...................... 455/550.1 |
| 2004/0233930 A1 | 11/2004 | Colby, Jr. |
| 2004/0268005 A1 | 12/2004 | Dickie |
| 2005/0073446 A1 * | 4/2005 | Lazaridis et al. ............... 341/22 |
| 2005/0159184 A1 | 7/2005 | Kerner et al. |
| 2006/0003804 A1 | 1/2006 | Liu |
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |
| 2010/0173673 A1 * | 7/2010 | Lydon ........................... 455/557 |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

| Pin No. | Pin Name | Simple Jacket Functionality | Complex Jacket Functionality | Connected to |
|---|---|---|---|---|
| 1 | USB_DP | USB D+/Audio right | USB D+/Audio right | USB switch |
| 2 | USB_DN | USB D-/Audio left | USB D-/Audio left | USB switch |
| 3 | HS_MIC | Audio microphone | Audio microphone | HS_MIC |
| 4 | USB_VBUS | USB_VBUS | USB_VBUS | VBUS |
| 5 | JTAG_V-PUMP | V-PUMP 3.3v | V-PUMP 3.3v | FPGA_VPUMP |
| 6 | GND | GND | GND | GND |
| 7 | AUDIO_RIGHT | Not used | AUDIO_RIGHT | HS_R1 |
| 8 | AUDIO_LEFT | Not used | AUDIO_LEFT | HS_L1 |
| 9 | JTAG_TDO | JTAG_TDO | JTAG_TDO | FPGA_TDO |
| 10 | GND | GND | GND | GND |
| 11 | VBAT_HOST | VBAT_J | VBAT_J | Power ADCIN3 & VAC |
| 12 | JTAG_TRST | JTAG_TRST | JTAG_TRST | FPGA_TRST |
| 13 | VBAT_comm | VBAT_COMM | VBAT_COMM | Battery |
| 14 | RCLK/WLED | WLED enable control pin | RCLK – Return clock | FPGA pin C26 |
| 15 | 3V-VCC | 3V | Not Used | SJ_3V_VCC |
| 16 | RESUME | RESUME | RESUME | Power – RPWON |
| 17 | COMM_SIG/32KHz | Vibrator enable control | 32 KHz Clock | FPGA pin A36 |
| 18 | COMM_DAT0 (CAM/LCD/CS-0) | KBD10 | COMM_DAT0 (CAM/LCD/CS-0) | FPGA pin A30 |
| 19 | COMM_DAT1 (CAM/LCD/CS-1) | KBD11 | COMM_DAT1 (CAM/LCD/CS-1) | FPGA pin A31 |
| 20 | COMM_DAT2 (CAM/LCD/CS-2) | KBD12 | COMM_DAT2 (CAM/LCD/CS-2) | FPGA pin B27 |
| 21 | COMM_DAT3 (CAM/LCD/CS-3) | KBD13 | COMM_DAT3 (CAM/LCD/CS-3) | FPGA pin B29 |
| 22 | COMM_MNG/INT | Jacket Interrupt | Jacket Interrupt | Modem pin K8 |
| 23 | VCC_COMM_J/HW-R | HW-R-3V | VCC COMM – 3V | FPGA pin A44 & pin C12 |
| 24 | COMM_CLK/52MHz | KBD14 | 52 MHz Clock | FPGA pin B32 |
| 25 | GND | GND | GND | GND |
| 26 | COMM_DAT4/SPI-CLK | KBD00 | SPI_CLK | FPGA pin A32 |
| 27 | COMM_DAT5/ commSPI-O/jacketSPI-I | KBD02 | SPI_MOSI | FPGA pin A33 |
| 28 | COMM_DAT6/ commSPI-I/jacketSPI-O | KBD03 | SPI_MISO | FPGA pin B30 |
| 29 | COMM_DAT7/SPI-CS | KBD01 | SPI_CS | FPGA pin G27 |

FIG. 8

WIRELESS COMMUNICATOR JACKET WITH MULTIPLE OPERATIONAL STAGES

CROSS REFERENCES TO RELATED APPLICATIONS

This application claims benefit of U.S. Provisional Application No. 61/152,708, entitled WIRELESS COMMUNICATOR JACKET WITH MULTIPLE OPERATIONAL STAGES, filed on Feb. 15, 2009 by inventors Itay Sherman and Yohan Cohen.

FIELD OF THE INVENTION

The present invention relates to miniature wireless communicators that operate in conjunction with jacket devices.

BACKGROUND OF THE INVENTION

Miniaturization of electronic devices poses many challenges for efficiency and cost-effectiveness of mechanical design, circuit design and signal processing. Among these challenges is the challenge of developing and manufacturing devices with small connectors that are reliable and that use a limited number of pins.

SUMMARY OF THE DESCRIPTION

Aspects of the present invention relate to a miniature modular wireless communicator, such as a cell phone module, that interoperates with a variety of jackets. When attached to or inserted in the jacket, the communicator provides each jacket with wireless communication capabilities, and the jacket provides the communicator with a user interface.

Embodiments of the present invention include inexpensive jackets with very simple functionality. These simple jackets have a display screen, a keypad, an optional backlight for the keypad, and an optional vibrator. The simple jackets may also have a serial NOR flash memory. The simple jackets have jacket IDs, which are used by the communicator to identify the jackets.

Embodiments of the present invention also include jackets with complex functionality.

Because of their low cost, users can generally afford to purchase a variety of distinct jackets, each having a unique look & feel, with a unique shape, a unique casing, a unique display screen and a unique keypad. Designers may create business jackets, party jackets, glitzy jackets, formal jackets, outdoors jackets, sports jackets, travel jackets, ethnic jackets, club jackets, student jackets, collector jackets, humorous jackets, theme jackets, souvenir jackets, celebrity jackets, custom ordered jackets, and more. And users can change jackets at will, and dress up their cell phones according to occasion and personal taste. Low cost jackets also afford marketing opportunities, whereby jackets are branded and used as marketing collateral and distributed for free.

Clearly the success of the "jacket" business depends on the ability to inexpensively manufacture the jackets.

In accordance with embodiments of the present invention, a digital interface uses 12 connector pins for simple jacket identification and for keypad decoding. Some of the communication lines through the connector pins are used for general purpose I/O, and run directly to the keypad.

Embodiments of the present invention use the 12 pins in a very efficient way to enable four operational stages, and transitions therebetween. The four stages include:

Stage 1: Initial Type Detection—determining whether the jacket is a simple type of jacket or a complex type of jacket.
Stage 2: Complex Jacket—12-pin communication bus for a designated protocol.
Stage 3: Simple Jacket Identification—identifying a jacket ID.
Stage 4: Normal Keypad Decode—decoding a 4×5 keypad array and controlling activation of a backlight for the keypad and activation of a vibrator.

There is thus provided in accordance with an embodiment of the present invention a method of communication between a modular wireless communicator and a jacket device that is connected to the modular wireless communicator via a connector that connects a plurality of signal transmission lines, the jacket device including a keypad for operating the modular wireless communicator, including receiving a multi-bit signal over multiple signal transmission lines, one bit of which indicating whether the jacket device includes a serial NOR flash memory, if the jacket device includes a serial NOR flash memory, then reading a jacket ID from the serial NOR flash memory, if the jacket device does not include a serial NOR flash memory, then reading the jacket ID from other bits of the multi-bit signal, receiving jacket keypad signals over multiple signal transmission lines, and decoding the jacket keypad signals based on the jacket ID.

There is additionally provided in accordance with an embodiment of the present invention a communication system including a modular wireless communicator including a connector for connecting the communicator to any one of a plurality jacket devices via a plurality of signal transmission lines, a controller, communicatively coupled with the connector, for receiving signals, over multiple transmission lines, that identify a jacket device that is connected to the communicator, and for receiving signals, over multiple transmission lines, generated by keypad presses from the identified jacket device, and a modem, communicatively coupled with the controller, for transmitting data over the air in response to the keypad presses, and a plurality of jacket devices, each jacket device including a keypad for receiving user input via keypad presses, and a connector, communicatively coupled with said keypad, for connecting the jacket device to said communicator via the plurality of signal transmission lines.

BRIEF DESCRIPTION OF THE DRAWINGS

The present invention will be more fully understood and appreciated from the following detailed description, taken in conjunction with the drawings in which:

FIG. 8 is a connector pinout table for an implementation of a communicator that is connected to a jacket, in accordance with an embodiment of the present invention.

DETAILED DESCRIPTION

Aspects of the present invention relate to a miniature modular wireless communicator, such as a modular cell phone, and a jacket device. The communicator attaches to the jacket, or inserts partially or entirely inside the jacket. When attached to or inserted in the jacket, the communicator and jacket interoperate—the communicator providing the jacket with wireless communication capabilities, and the jacket providing the communicator with a user interface.

Embodiments of the present invention enable manufacture of jackets at very low cost. Users can afford to buy a variety of jackets, which in turn enables an entire market for cell phone jacket design.

Figure 1:
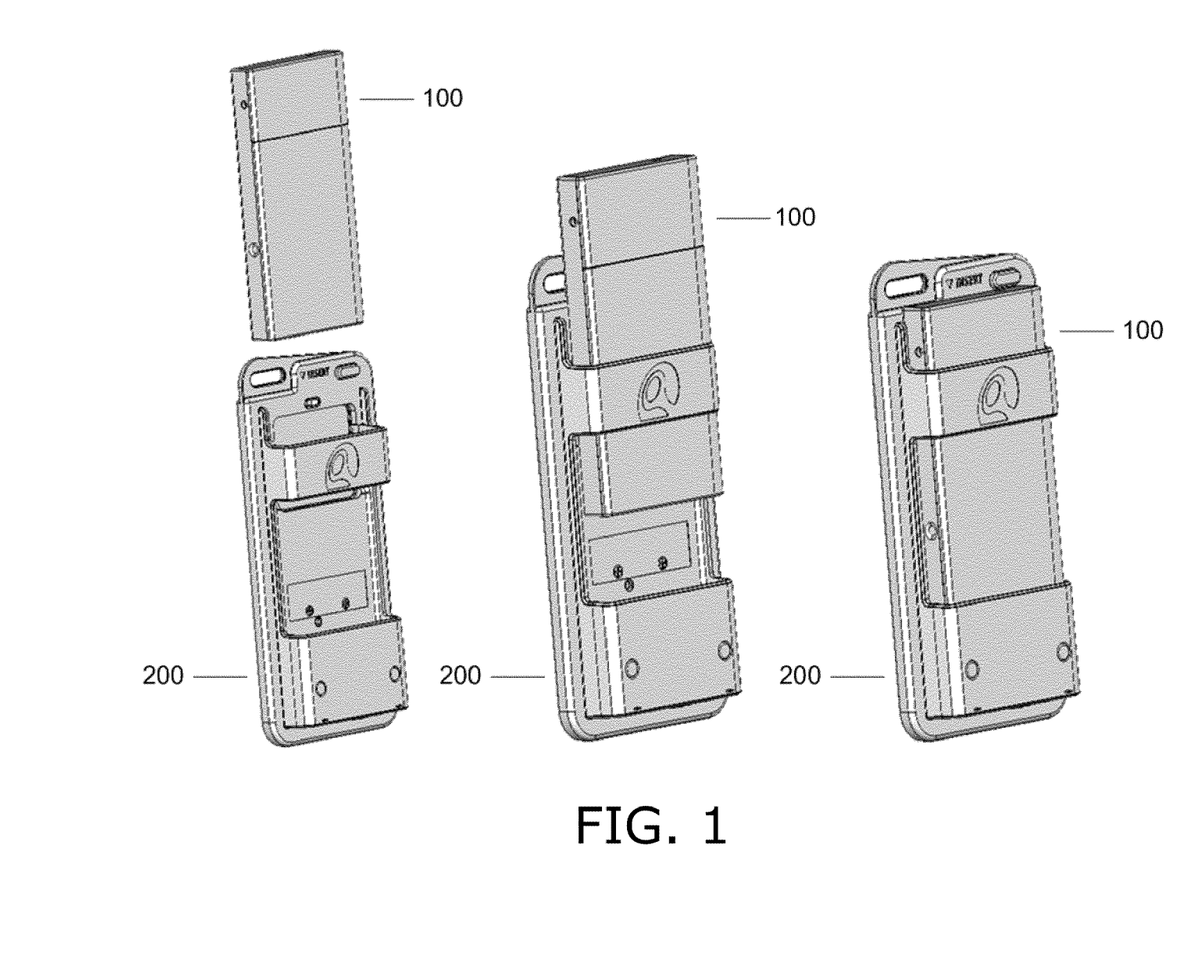
FIG. 1 is an illustration of a modular wireless communicator and a jacket therefor, in accordance with an embodiment of the present invention.
Figure 2:
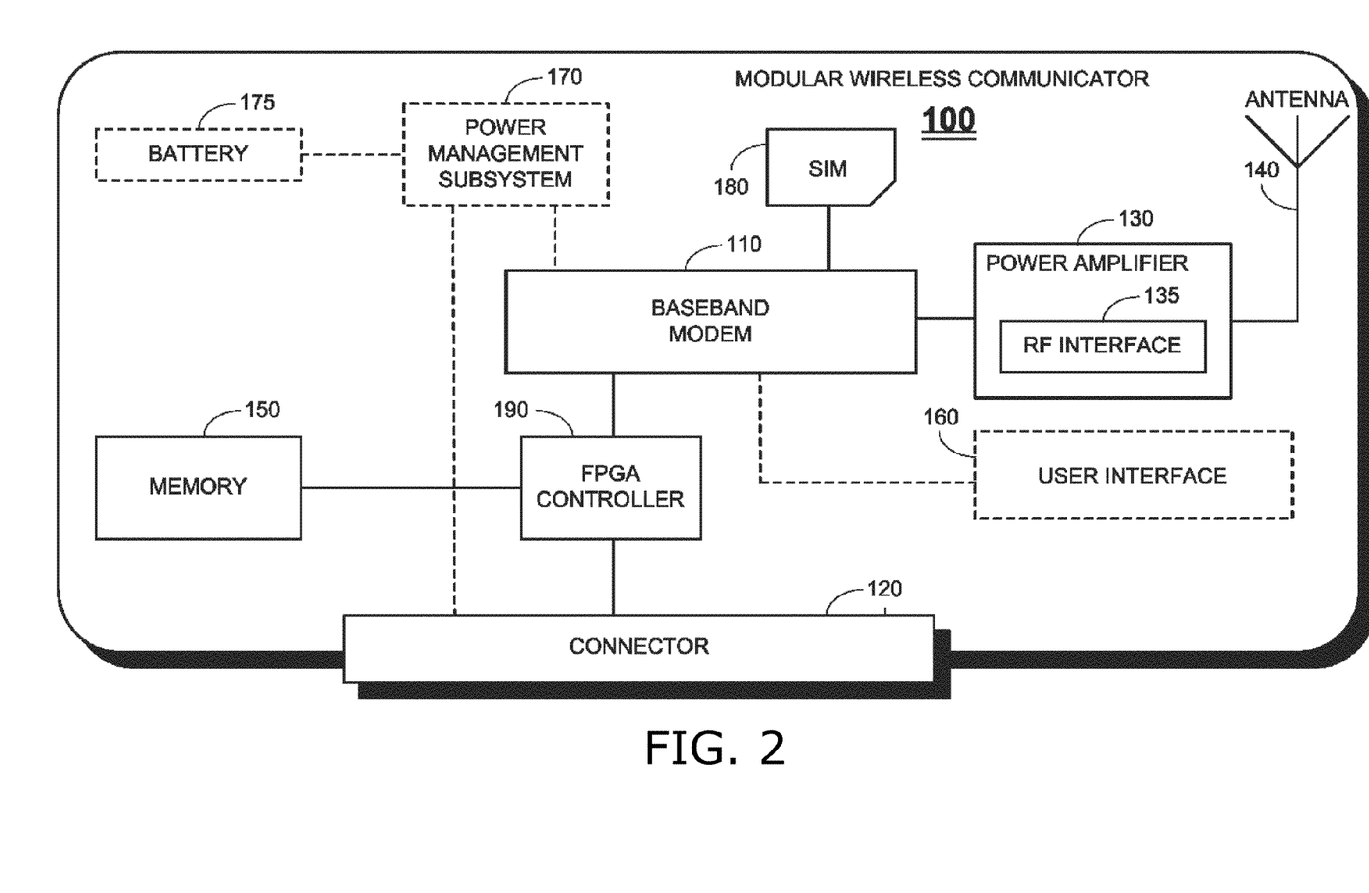
FIG. 2 is a simplified block diagram of the modular wireless communicator of FIG. 1, in accordance with an embodiment of the present invention.

Reference is now made to FIG. 1, which is an illustration of a modular wireless communicator 100 and a jacket 200, in accordance with an embodiment of the present invention. Reference is also made to FIG. 2, which is a simplified block diagram of modular wireless communicator 100, in accordance with an embodiment of the present invention.

FIG. 1 shows stages of attaching communicator 100 to jacket 200. As shown in FIG. 2, communicator 100 includes a cellular base band modem 110, a connector 120 for connecting the communicator to jacket 200, a power amplifier 130 with an RF interface 135 that is connected to an antenna 140, a memory 150, a subscriber identity module (SIM) card 180, and an FPGA controller 190. Modem 110 controls the wireless communication functionality of communicator 100. Controller 190 executes programmed instructions that control the data flow between communicator 100 and jacket 200 via signal lines that pass through connector 120. Optionally, communicator 100 may include a user interface 160, and a power management subsystem 170 that charges a battery 175.

Figure 3:
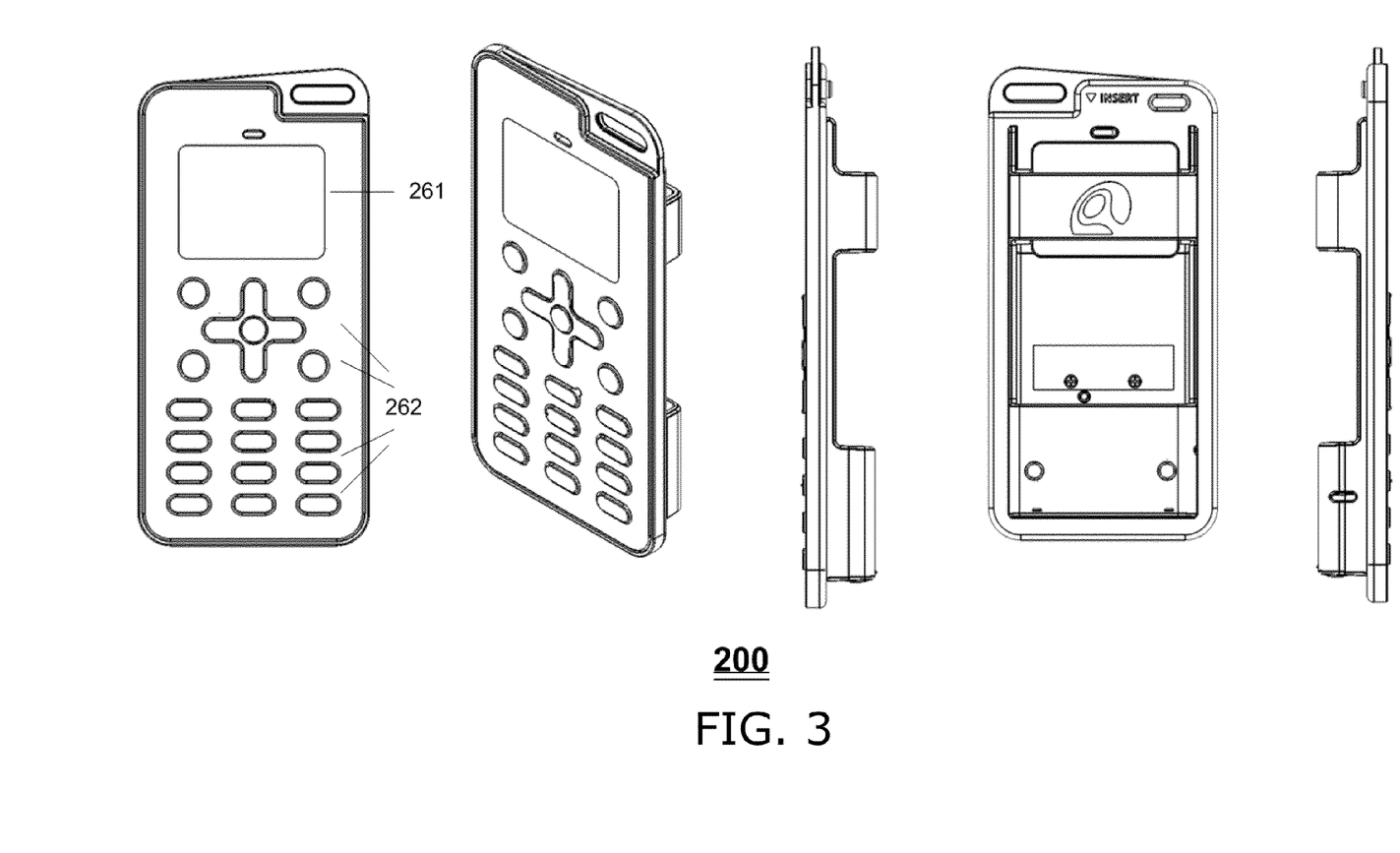
FIG. 3 is an illustration of the jacket of FIG. 1, in accordance with an embodiment of the present invention.
Figure 4:
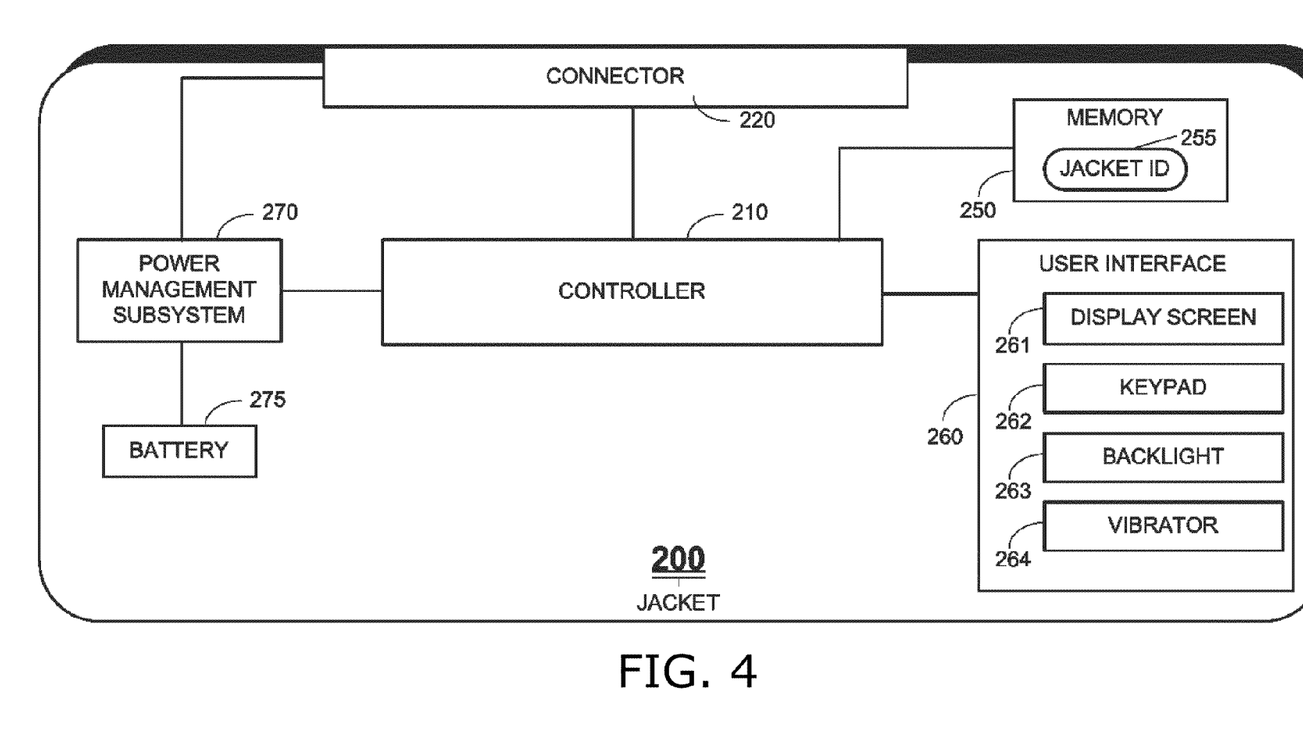
FIG. 4 is a simplified block diagram of the jacket of FIG. 1, in accordance with an embodiment of the present invention.

Reference is now made to FIG. 3, which is an illustration of jacket 200, in accordance with an embodiment of the present invention. Reference is also made to FIG. 4, which is a simplified block diagram of jacket 200, in accordance with an embodiment of the present invention. FIG. 3 shows five perspective views of jacket 200. As shown in FIG. 4, jacket 200 includes a field-programmable gate array (FPGA) controller 210, a connector 220 for connecting the jacket to communicator 100, a memory 250 storing a jacket ID 255, a user interface 260 including a display screen 261, a keypad 262, a backlight 263 for keypad 262, and a vibrator 264, and a power management subsystem 270 and battery 275. In one embodiment of the present invention, jacket ID 255 is a 4-bit code. User interface 260 may optionally include additional components (not shown) such as a microphone, a headset audio jack, an earpiece, and a mono speaker or stereo speakers.

In accordance with embodiments of the present invention, communicator 100 interoperates with a variety of jackets 200, some of which are standalone devices, and some of which are only operable in conjunction with communicator 100. Some jackets, such as the jacket shown in FIG. 3, have only a screen, a keypad, an optional backlight for the keypad, and an optional vibrator. Such jackets are referred to herein as "simple" jackets. Simple jackets may include a serial NOR flash memory.

Other jackets have more functionality, and are referred to herein as "complex" jackets. Communicator 100 may also interoperate with peripheral devices, in addition to jackets 200.

One of the many challenges in developing and manufacturing communicator 100 is the requirement of miniature size and reliable connection to jackets 200. As such, communicator 100 is pin-limited. In one implementation of the present invention, a 12-pin interface is used to provide both a full communication bus for complex jackets, and an interface for jacket identification and keypad decoding for simple jackets. The 12 interface pins provide multiplexed functionality for four operational stages. Functionality switches according to transitions from a current stage to a next stage, as described in detail hereinbelow.

Figure 5:
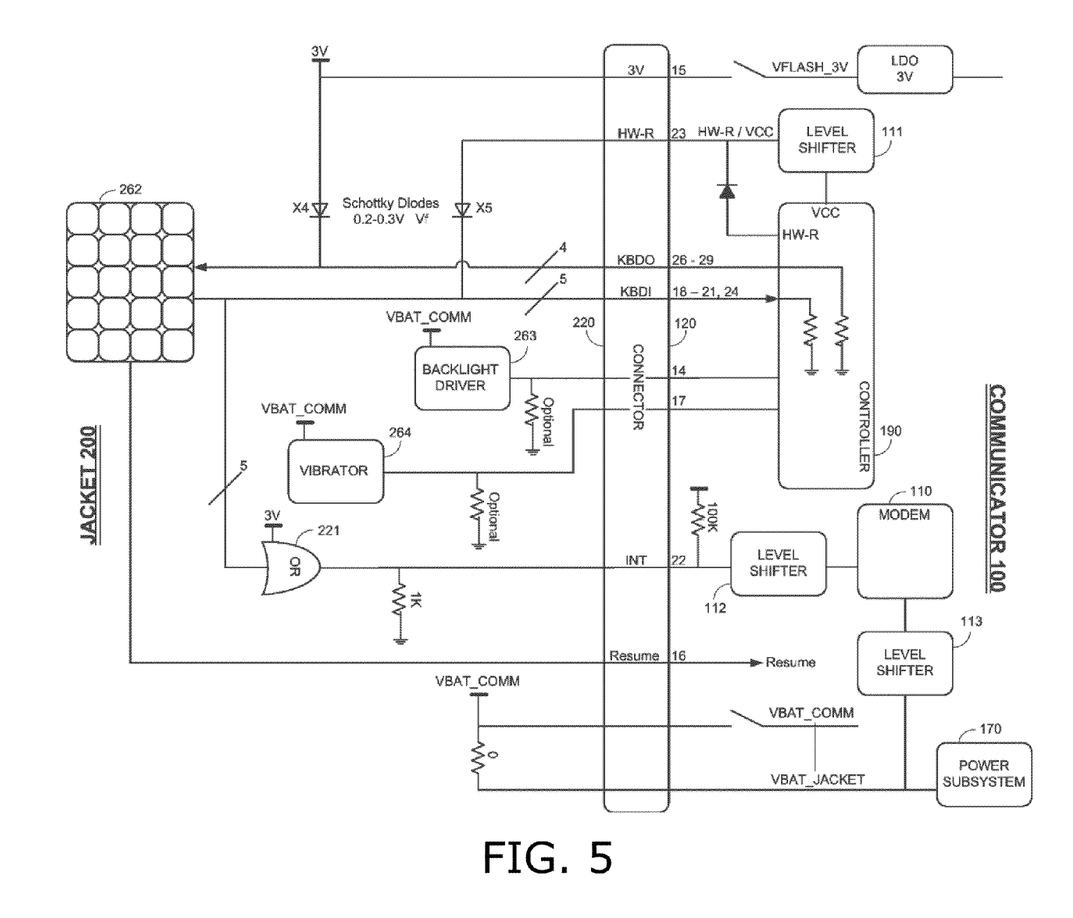
FIG. 5 is a high level circuit diagram for a first jacket, in accordance with an embodiment of the present invention.
Figure 6:
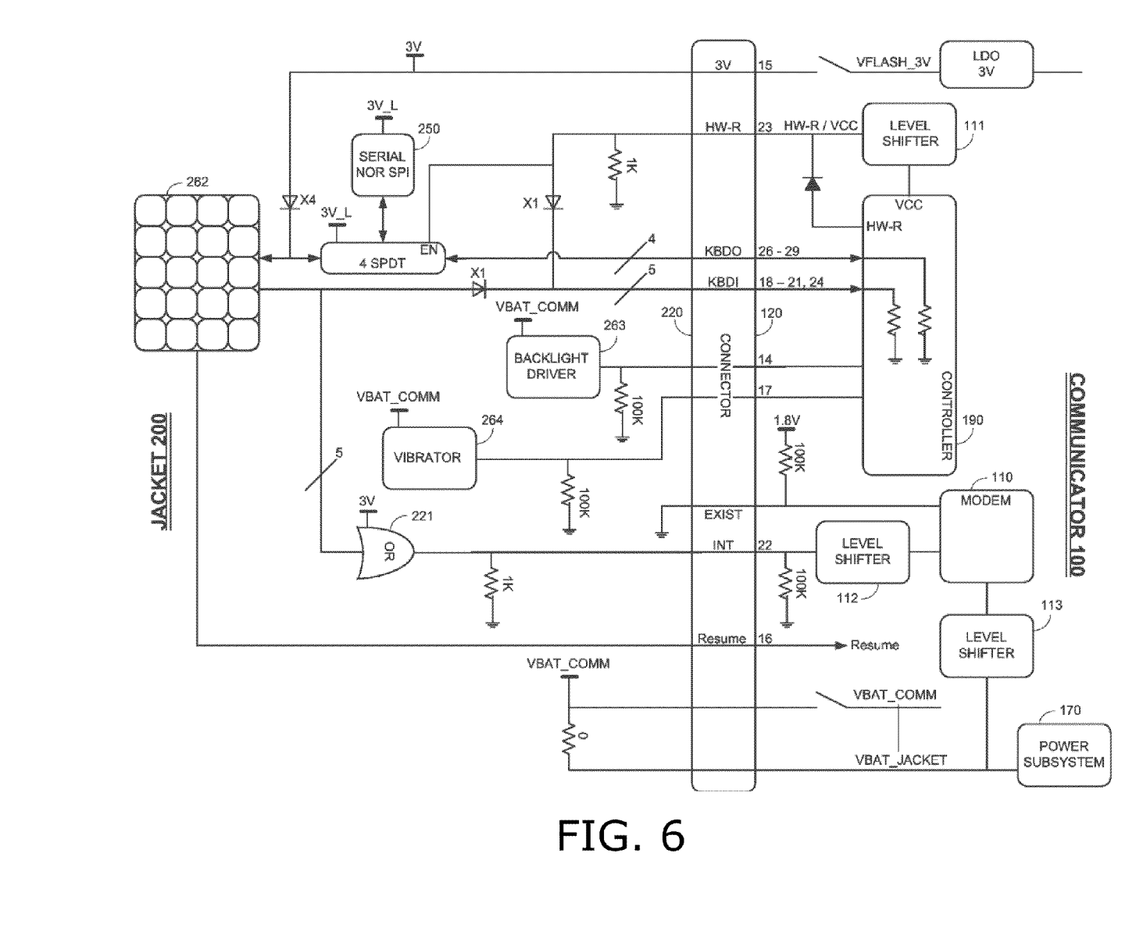
FIG. 6 is a high level circuit diagram for a second jacket that includes a serial NOR flash memory, in accordance with an embodiment of the present invention.

Reference is now made to FIG. 5, which is a high level circuit diagram for a first jacket, in accordance with an embodiment of the present invention. Reference is also made to FIG. 6, which is a high level circuit diagram for a second jacket that includes a serial NOR flash memory 250, in accordance with an embodiment of the present invention. Components of communicator 100 are shown to the right of connector 120/220, and components of jacket 200 are shown to the left of connector 120/220.

As shown in FIGS. 5 and 6, connector 120/220 uses 4 pins (pins 26-29) for keypad columns, 5 pins (pins 18-21 and 24) for keypad rows, one pin for activating backlight 263, one pin for activating vibrator 264, and one additional pin connected to a level shifter 111. A single pin (pin 14) is used to control an N-channel FET transistor, which turns backlight 263 on and off. Similarly, a single pin (pin 17) is used to control another N-channel FET transistor, which turns vibrator 264 on and off. The pin (pin 23) connected to level shifter 111 is used for hardware recognition.

TABLE I describes four operational stages for these jackets, and transitions therebetween.

TABLE I

Operational Stages and Transitions Therebetween

| Stage | Functionality |
| --- | --- |
| 1. Initial Type Detection | Controller 190 senses voltage on one of the pins. Jacket 200 uses a pull-up or a pull-down resistor to indicate the type of jacket (simple or complex), via a level shifter 111. For a complex jacket 200, proceed to Stage 2. For a simple jacket 200, proceed to Stage 3. |
| 2. Complex Jacket | If jacket 200 is a complex jacket, the 12 pins are used as a communication bus with a designated protocol. In one implementation the pins are used as follows: Clock In/Out, Data Bus 0-7, Management Bus In/Out |
| 3. Simple Jacket Identification | If jacket 200 is a simple jacket, controller 190 drives a logical '1' to identification circuitry that is muxed over lines that are used for keypad analysis. If the most significant bit (MSB) of the code is '1', then jacket 200 includes a serial NOR flash memory (FIG. 6), from which jacket ID 255 is read. If the MSB is '0', then jacket 200 does not include a serial NOR flash memory (FIG. 5), and the next 4 bits indicate the jacket ID 255. Proceed to Stage 4. |
| 4. Normal Keypad Decode | Controller 190 performs matrix keypad decode for a keypad array 262 of 4 × 5 buttons, which requires 4 + 5 = 9 signals. Two other lines are used to control activation of backlight 263 and vibrator 264. |

Regarding Stage 1, Initial Type Detection, when communicator 100 is connected to jacket 200, the interrupt line (pin 22), which was in high state on communicator 100 prior to being connected to jacket 200, is pulled down by a 1 kΩ resistor. This indicates to controller 190 that jacket 200 is now connected thereto. Subsequently controller 190 opens the VBAT_COMM switch towards jacket 200. The 3V directed from communicator 100 to jacket 200 is disconnected at this Stage, to prevent false ID reading.

In order to determine whether jacket 200 is a simple jacket or a complex jacket, controller 190 checks the VCC_COMM pin (pin 23). The VCC_COMM pin, on complex jackets, is 3V directed from jacket 200 to communicator 100. On the side of jacket 200, the VCC_COMM is generated by an LDO, and is cut from VBAT_COMM, which passes on connector 220. On the side of communicator 100, VCC_COMM is connected to a 1.8V bank, which is always on, and thus requires a 3V to 1.8V level shifter 111 along the way.

As such, if controller 190 finds that the VCC_COMM pin is high (1.8V), then controller 190 identifies jacket 200 as being a complex jacket. If controller 190 finds that the VCC_COMM pin has no voltage, then controller 190 identifies jacket 200 as being a simple jacket.

Figure 7:
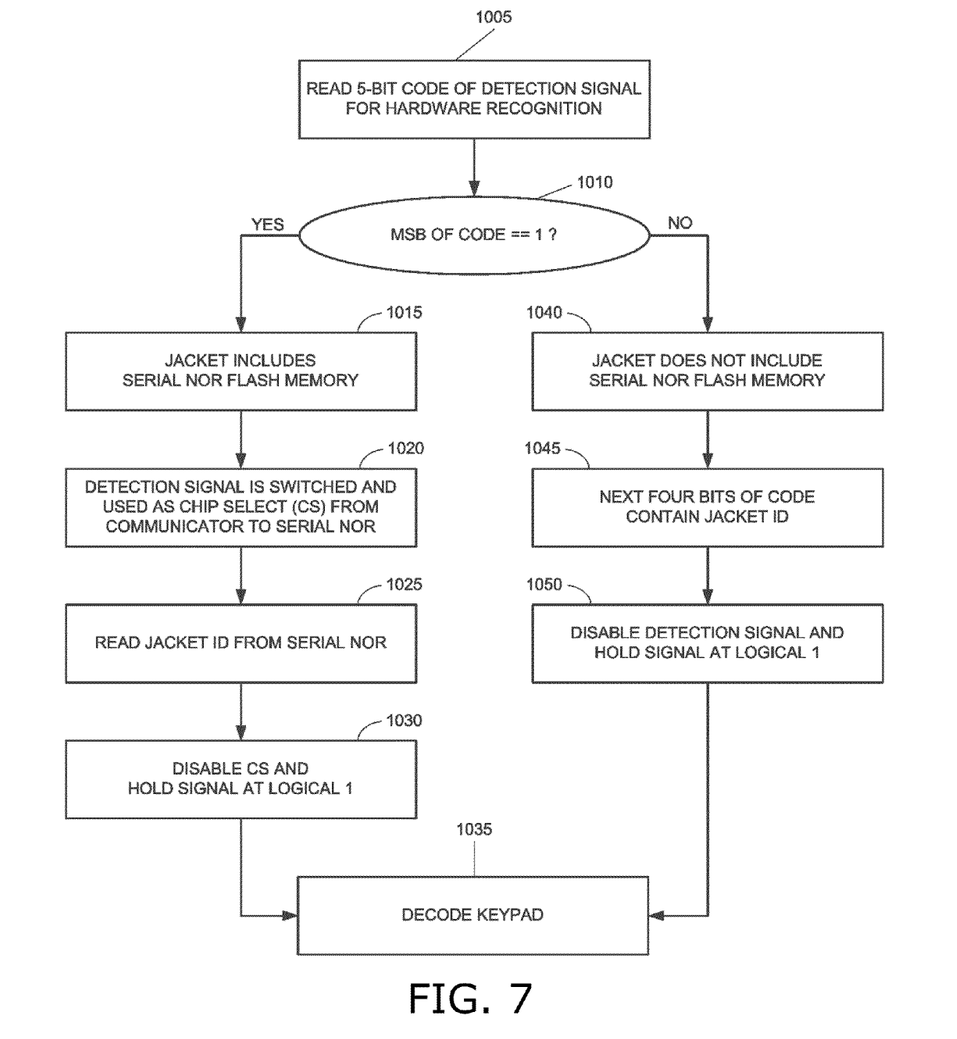
FIG. 7 is a simplified flowchart of a method for jacket identification, in accordance with an embodiment of the present invention.

Regarding Stage 3, Simple Jacket Identification, reference is now made to FIG. 7, which is a simplified flowchart of a method for jacket identification, in accordance with an embodiment of the present invention. At step 1005 controller 190 reads a 5-bit code of a detection signal. Specifically, referring to FIGS. 5 and 6, the HW-R pin (pin 23) is set to high and drives the VCC_COMM/HW-R line. The VCC_COMM/HW-R passes to jacket 200 and drives 1-5 pull-up resistors located on the KBDI lines. These pull-up resistors generate a 5-bit code on the KBDI lines, which is sampled by controller 190. This is the 5-bit code that is read at step 1005.

If the most significant bit (MSB) of the 5-bit code is '1', as determined at step 1010, then jacket 200 includes serial NOR flash memory 250 (as in FIG. 6), as indicated at step 1015. At step 1020 the detection signal is switched, and used as a chip select (CS) signal for selecting between communicator 100 and serial NOR 250. At step 1025, some of the communication bus data lines are used to access serial NOR 250 and read the jacket ID 255 therefrom. At step 1030, after content of serial NOR 250 is read, the CS is disabled and held at logical '1'. As such, the output of serial NOR 250 is put in tri-state, and thus blocked from interfering with keypad decode operations. The 3V switch on communicator 100 is opened, and feeds jacket 200 through pin 15. Subsequently, at step 1035 controller 190 transitions to Stage 4, Normal Keypad Decode.

If the MSB of the code is '0', as determined at step 1010, then jacket 200 does not include a serial NOR flash memory (as in FIG. 5), as indicated at step 1040. At step 1045 the next four bits of the code read at step 1005 are used to identify the jacket ID 255. At step 1050, after identifying the jacket ID, the detection signal is disabled and held at logical '1', thus blocking the identification data from interfering with keypad decode operations. The 3V switch on communicator 100 is opened, and feeds jacket 200 through pin 15. Subsequently, at step 1035 controller 190 transitions to Stage 4, Normal Keypad Decode.

The jacket ID identified at step 1025 or step 1045, is used to identify the jacket's keypad, so that controller 190 is able to decode the keypad strokes.

Regarding Stage 4, Normal Keypad Decode, keypad operation is generally divided into Idle State, and Flash Freeze. During "Idle State", keypad scans are performed periodically. Any keypad press is immediately sampled by controller 190. During "Flash Freeze", the keypad is not scanned. When a keypad is pressed, controller 190 must be awakened and scan the keypad.

All four KBDO lines in FIGS. 5 and 6 are pulled-up by resistors on the side of jacket 200. When a key is pressed, at least one of the KBDI lines is pulled high, and an OR gate 221 output is initiated to high state. The output of OR gate 221 is connected to the interrupt line that goes to modem 110. Modem 110 senses the interrupt line and awakens controller 190 from Flash Freeze. Once controller 190 is awakened, it begins scanning the keypad lines. It is noted that, typically, a standard keypad press is sufficiently long to generate a wakeup and a keypad scan without missing the keypad press.

When communicator 100 is disconnected from jacket 200, VBAT_JACKET drops immediately to 0V. VBAT_JACKET is connected to modem 110 via level shifter 113. As such, an interrupt is used to notify controller 190 of jacket disconnection, instead of controller 190 having to regularly poll VBAT_JACKET.

Implementation Details

FIG. 8 is a connector pinout table for an implementation of a communicator that is connected to a jacket, in accordance with an embodiment of the present invention. The table of FIG. 8 corresponds to the circuit diagrams of FIGS. 5 and 6. As such, pins 18-21, 24 and 26-29 are connected to keypad 262, pin 14 is connected to optional backlight driver 263, pin 17 is connected to optional vibrator 264, and pin 23 is used for hardware recognition. Power for backlight driver 263 and for vibrator 264 is taken from VBAT_COMM. In an alternate implementation, power for backlight driver 263 and for vibrator 264 is taken from VCC_3V.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of communication between a modular wireless communicator and any one of a plurality of jacket device devices, the method comprising:
   receiving, by the modular wireless communicator from a jacket device connected thereto, a one-bit signal over one of the signal transmission lines, the one-bit signal indicating whether the jacket device is of a simple type or of a complex type, wherein any one of a first and a second jacket device is connected to the modular wireless communicator via a connector that connects multiple signal transmission lines, wherein each of the first and second jacket devices include input controls for operating the modular wireless communicator, wherein the first jacket device includes a serial NOR (Not OR) flash memory, and wherein the second jacket device does not include a serial NOR flash memory;
   receiving, by the modular wireless communicator from the jacket device connected thereto, a multi-bit signal over plural ones of the multiple signal transmission lines, one bit of which indicating whether the jacket device includes a serial NOR flash memory;
   if the jacket device connected to the modular wireless communicator includes a serial NOR flash memory, then identifying, by the wireless communicator, a jacket ID from the serial NOR flash memory;
   if the jacket device connected to the modular wireless communicator does not include a serial NOR flash memory, then identifying, by the wireless communicator, the jacket ID from other bits of the multi-bit signal;
   receiving, by the wireless communicator from the jacket device connected thereto, jacket user input signals over plural ones of the multiple signal transmission lines; and decoding, by the wireless communicator, the jacket user input signals based on the jacket ID, wherein if the jacket device is of a complex type, then said decoding decodes the jacket user input signals based on a pre-designated protocol.

2. The method of claim 1 wherein the first and second jacket input controls each comprises a keypad, and wherein said receiving jacket user input signals comprises receiving keypad row signals and receiving keypad column signals.

3. A communication system, comprising:
a modular wireless communicator comprising:
a connector for connecting the communicator to any one of a first and a second jacket device via multiple signal transmission lines;
a controller, communicatively coupled with said connector, for receiving one or more identification signals, over plural ones of the multiple transmission lines, that identify a jacket device that is connected to the communicator, for receiving user input signals, over plural ones of the multiple transmission lines, generated by input controls from the identified jacket device, and for decoding the received user input signals based on the received one or more identification signals; and
a wireless modem, communicatively coupled with said controller, for transmitting data over the air in response to the decoded user input signals;
a first jacket device comprising:
input controls for receiving user input;
a serial NOR (Not OR) flash memory; and
a connector, communicatively coupled with said input controls, for connecting the first jacket device to said communicator via the multiple transmission lines; and
a second jacket device comprising:
input controls for receiving user input; and
a connector, communicatively coupled with said input controls, for connecting the jacket device to said communicator via the multiple signal transmission lines, wherein the second jacket device does not comprise a serial NOR flash memory,
wherein the received one or more identification signals indicate whether a jacket device that is connected to the communicator comprises a serial NOR flash memory and whether the jacket device is of a simple type or of a complex type, wherein said wireless modem identifies the jacket device by reading the jacket ID from said NOR flash memory if the jacket device comprises a serial NOR flash memory, wherein said wireless modem identifies the jacket device by reading the jacket ID from the identification signal if the jacket device does not comprise a serial NOR flash memory, and wherein said controller decodes the jacket user input signals based on a pre-designated protocol if the jacket device is of a complex type.

4. The communication system of claim 3 wherein said first and second jacket input controls comprise a keypad, and wherein the user input signals comprise row and column signals for a keypad array.

5. The communication system of claim 3 wherein said first and second jacket input controls comprise a keypad, wherein the multiple signal transmission lines comprises 12 signal transmission lines, and wherein said keypad comprises 5 rows and 4 columns.

6. The communication system of claim 3 wherein at least one of said first and second jacket devices comprises a backlight for a keypad, the backlight being activated via one of the signal transmission lines.

7. The communication system of claim 3 wherein at least one of said first and second jacket devices comprises a vibrator, the vibrator being activated via one of the signal transmission lines.

8. The communication system of claim 3 wherein one of the multiple transmission lines is used as a chip select, to select between said communicator and said serial NOR flash memory.

9. The communication system of claim 3 wherein each of said first and second jacket devices comprises a battery for supplying power to the jacket device, and for supplying power to said communicator when said communicator is connected to the jacket device.

10. The communication system of claim 3 wherein at least one of said first and second jacket devices comprises a display screen for displaying input from said keypad and output from said modem.

* * * * *